May 28, 1968     R. L. WATTERS     3,386,086
METHOD AND APPARATUS FOR BINAURALLY INDICATING ELECTRIC
SIGNAL MAGNITUDE
Filed Oct. 16, 1964
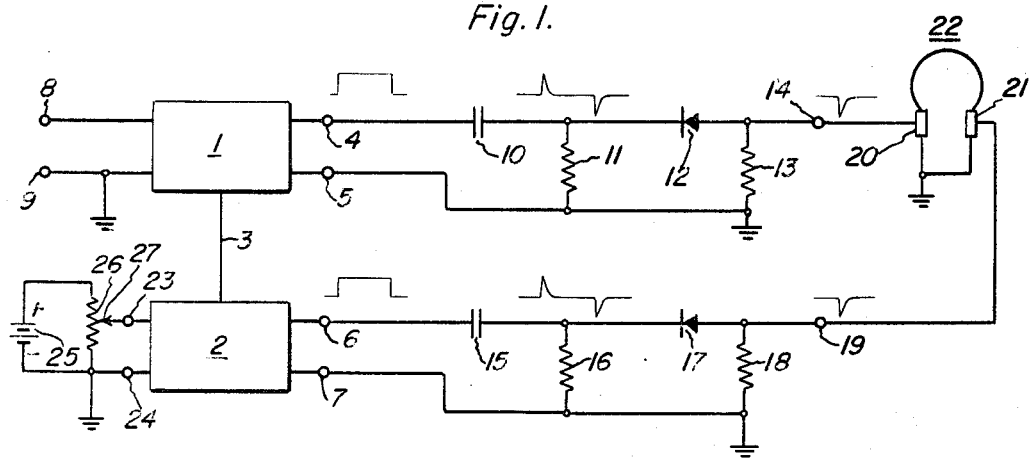
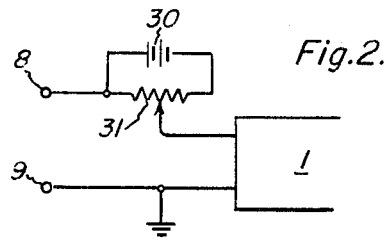
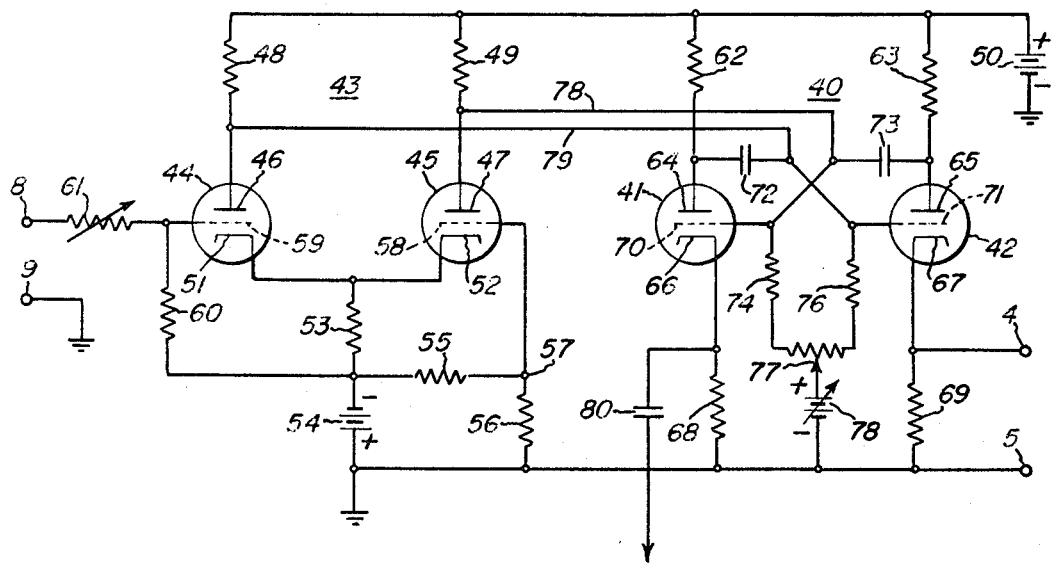
Inventor:
Robert L. Watters,
by John F. Ahern
His Attorney.

3,386,086
METHOD AND APPARATUS FOR BINAURALLY INDICATING ELECTRIC SIGNAL MAGNITUDE
Robert L. Watters, Schenectady, N.Y., assignor to General Electric Company, a corporation of New York
Filed Oct. 16, 1964, Ser. No. 404,287
8 Claims. (Cl. 340—242)

ABSTRACT OF THE DISCLOSURE

Voltage sensing is accomplished by supplying pulses generated at a fixed audio frequency rate to one ear and supplying pulses generated at an audio frequency rate varied in accordance with a sensed voltage magnitude to the other ear. The time spacing between pulses creates the sensation that the pulses are originating from a particular direction, which changes as the time spacing changes, so that very slow changes in sensed voltage magnitude are readily detected.

---

The present invention generally relates to means for indicating deviations in the magnitude of an electric signal from a predetermined magnitude and more particularly pertains to such means for use where the expected deviations in magnitude are small and may occur slowly over a long period of time.

It is oftentimes highly desirable to provide an indication of departures in the magnitude of an electric signal above or below a predetermined magnitude. For example, leaks in evacuated systems are oftentimes detected by directing an ionizable gas over the exterior surfaces of the system while monitoring the internal ionization rate. The ionization rate is monitored by detecting changes in the magnitude of a corresponding electric signal. If the leak is relatively small, an additional complication arises because the change in ionization rate, and resultant change in signal strength, occurs over a long period of time in the order of from a few seconds to many minutes.

Sometimes, it is required that an indication of departures of an electric signal from a predetermined magnitude be brought to the attention of an operator without requiring visual distraction. Preferably in such cases, the operator is made aware of deviations in signal strength through other than the visual sense because visual attention may be required for other purposes. For example, in the preceding example, complete visual concentration is oftentimes required to perform the act of directing the tracer gas around the evacuated system, that is likely to be frangible, in order to avoid breaking components thereof. A particularly advantageous means for detecting leaks without visual distraction is described and claimed in my copending application entitled "Apparatus and Method for Detecting Leaks in Evacuated Systems," Ser. No. 372,803, filed June 5, 1964, and assigned to the assignee of the present invention.

In accordance with the invention of the aforementioned copending application, variations in the magnitude of an electric signal, corresponding to changes in the ionization rate, are converted to variations in frequency of an audible signal. Thus, an operator discovers a change in ionization rate by noting changes in frequency of an audible signal, that can be detected through a headset or earphones, for example. While such detection of leaks is advantageously employed in most cases, there are situations wherein it is necessary to detect extremely slow variations in the signal strength. With the exception of those few individuals gifted with perfect pitch, ordinary operators are unable to detect a change in frequency of an audible signal that changes extremely slowly.

Accordingly, it is an object of this invention to provide an audible detector providing an indication of extremely slow variations in magnitude of an electric signal from a predetermined magnitude.

It is another object of this invention to provide improved methods and apparatus for detecting leaks in evacuated systems.

It is still another object of this invention to provide apparatus which can be used by an ordinary operator to detect slow variations in the magnitude of an electric signal without visual distraction.

Briefly, in accord with the present invention binaural detection of variation in magnitude of an electric signal is featured. In one embodiment, audible reference pulses are applied to one earphone of a headset and audible pulses varying in time relationship relative thereto, in accord with the magnitude of an electric signal to be sensed, are applied to the other earphone of the headset. The timing of reference pulses is adjusted to select an apparent direction from which the sound is received. Thereafter, changes in magnitude of the electric signal to be sensed cause a variation in the time relationship between the two series of audible pulses and the apparent direction of sound is changed. By noting the apparent change in direction, the operator is made aware of a change in magnitude of the sensed signal, no matter how slowly such change may have occurred.

The features of my invention which I believe to be novel are set forth with particularity in the appended claims. My invention itself, however, both as to its organization and method of operation, together with further objects and advantages thereof, may best be understood by reference to the following description taken in connection with the accompanying drawings in which:

FIGURE 1 is a schematic illustration of a signal sensing system in accord with the invention;

FIGURE 2 is a partial schematic illustration of an alternative embodiment of the system of FIGURE 1; and, FIGURE 3 is a schematic circuit diagram of a specific pulse width modulator suitable for use in accord with the invention as illustrated in FIGURE 1.

In applications wherein visual observation is permitted it is a relatively simple matter for an operator to observe changes of position in an indicator, as a meter needle or the like, corresponding to variations in the magnitude of an electric signal that controls the indicator. Such detection is suitable even though the magnitude of the electric signal undergoes extremely slow variations. However, when visual observation may not be used, detection of relatively slow variations in strength of an electric signal has not been readily obtainable. Particularly, is this true where some quantitative indication of the extent of departure from a predetermined electric signal magnitude is desired or required. For example, an operator can not be reliably expected to notice extremely slow changes in either amplitude or frequency of an audible signal corresponding to equally slow variations in magnitude of the electric signal to be sensed.

I have discovered that the highly developed auditory sense that determines the apparent direction of a source of sound relative to the direction in which a listener is facing can be used under appropriate conditions to accurately and reliably detect variations in the magnitude of an electric signal and to quantitatively judge the relative extent of departure from a predetermined set magnitude. Accordingly, binaural detection is accomplished in accord with one embodiment of the present invention by providing separate audible signals to respective earphones of a headset worn by an operator. Means are provided to permit the operator to adjust one of the audible signals so that the apparent source of sound comes from one predetermined direction. A convenient selection is from a direction in which the operator is facing. The time of arrival of one set of audible signals relative to the other set of audible signals is made to change in accord with variations in magnitude of an electric signal to be sensed. In this way, variations in strength of the electric signal are detected as changes in apparent direction from which the sound emanates. Preferably, the sound appears to shift to one side for increases in magnitude of electric signal and appears to shift to the other side for decreases in magnitude of the electric signal.

Unlike other non-visual indications, once the reference is established in accord with the present invention the time lapse between observations does not deleteriously affect ability to provide an accurate detection. For example, an operator can adjust the apparatus of this invention to provide an apparent source of sound coming from the direction in which he is facing and thereafter return to the equipment hours, or even months, later and yet be able to ascertain by the apparent direction from which the sound source is emanating whether or not there has been a change in magnitude of the electric signal which is sensed. Essentially, the only limitation in this regard is the expense and detail with which the apparatus is constructed in order to be free of drift and other internal changes which could manifest themselves as erroneous changes in strength of the signal.

FIGURE 1 illustrates one preferred embodiment of the present invention and includes two pulse width modulatable pulse generators 1 and 2 that are interconnected by a synchronizing connection 3 which insures that a predetermined portion of their respective output signals occur simultaneously in time. Preferably, the respective output means 4, 5 and 6, 7 provide rectangular pulses in which case the leading edges thereof advantageously occur simultaneously in time. The pulse width of generator 1 is modulated, or caused to vary in accord with changes in voltage magnitude of a signal applied to input means 8 and 9 thereof.

Differentiating means, that can take the form of a series capacitance 10 and shunt resistance 11, as illustrated, differentiates the output pulse from generator 1. A rectifying network, that can comprise a series diode 12 and shunt resistance 13, permits only the negative portion of the differentiated signal to appear at output terminal 14. This is accomplished by connecting diode 12 so that its cathode is connected to capacitance 10, as shown. In this way, a short pulse corresponding in time only to occurrence of the trailing edge of the pulse from generator 1 is present at output terminal 14. By a short pulse is meant herein a pulse having a duration less than about one-tenth of the period of repetition, as required for optimum system sensitivity.

In similar manner, the output signal from generator 2 is differentiated by a differentiating means comprising series capacitance 15 and shunt resistance 16. The differentiated signal is rectified by rectifying means including series diode 17 and shunt resistance 18 so that a short negative pulse, coinciding ing time to the trailing edge of the output pulse of generator 2, is present at output terminal 19. Output terminals 14 and 19 are connected to respective spaced electro-mechanical transducers, as earphones 20 and 21 of headset 22.

The reference pulse width of generator 2 is adjusted by controlling the mignitude of input voltage applied to input means 23 and 24 of generator 2. To this end, a source 25 of substantially constant voltage, that can be a battery as illustrated, is connected in shunt with a resistance 26 having a variable tap 27 thereon. Tap 27 is connected to input terminal 23 and an appropriate terminal of source 25 is connected to input terminal 24. Whether the aforementioned appropriate terminal is the positive or negative terminal depends in most cases upon the specific character of generator 2 and the polarity of modulating input signal which the generator is adapted to accept. In many cases, the input signal may be of either polarity.

In operation, the input signal to be sensed is connected to input terminals 8 and 9 of generator 1. The pulse width of generator 2 is thereafter adjusted by moving adjustable tap 27 on resistance 26 until the sound heard at headset 22 appears to come from a predetermined direction. As mentioned before, the leading edges of the output signals of generators 1 and 2 are synchronized to occur simultaneously in time. Consequently, variations in the pulse width of audible pulses from generator 1 produce a corresponding time deviation between the time of occurrence of the trailing edges of corresponding, synchronized, pulses.

Only the pulses corresponding in time to the time of occurrence of the trailing edges are received at earphones 20 and 21 of headset 22. Thus, changes in the magnitude of an electric signal to input terminals 8 and 9 of generator 1 result in a change in time relationship between the two sets of audible pulses received at headset 22. Such variations in time manifest themselves to the wearer of headset 22 as a change in apparent direction of the sound source. In this way, changes of the magnitude of electric signal to input terminals 8 and 9 are detected.

FIGURE 2 is a partial schematic circuit diagram of a system as shown in FIGURE 1, showing alternative means for setting the relative time relationship between the pulses received. More specifically, the system in accord with FIGURE 2 provides for varying a unidirectional signal that is in series with the electric signal to be sensed. To this end, there is shown a voltage source 30, that can be a battery as illustrated schematically, and a resistance 31 connected in parallel circuit relationship and to input terminal 8 of pulse generator 1. Resistance 31 includes a variable tap 31 that is adjustable to vary the magnitude of voltage connected in series with the voltage to be sensed. In this way, the pulse width of generator 1 is varied to provide corresponding change in the apparent direction of a source of sound. In the embodiment of FIGURE 2, the source 25 and resistance 26 of FIGURE 1 are advantageously omitted in most cases.

While there are a large number of pulse generators that provide, or readily can be adapted to provide, pulses that vary in duration in accord with the magnitude of a control signal, I have found that the relaxation oscillator is a particularly advantageous selection from the viewpoints of ease of synchronization and reliability. The preferred type of relaxation oscillator for use in accord with the present invention is the positive grid multivibrator that is well-known in the art and explained in detail in a plurality of publications including "Electronic and Radio Engineering," fourth ed. (1955), by Terman, particularly at pp. 625–633 therein. Such a positive grid multivibrator 40 as illustrated schematically in FIGURE 3 and includes a pair of cross-coupled vacuum amplifying devices 41 and 42. In order to vary the duty cycle of multivibrator 40 while maintaining the pulse repetition rate thereof substantially constant, the control signal applied to terminals 8 and 9 is advantageously amplified and split into oppositely variable voltages by a cathode-coupled direct-current amplifier 43 which includes vacuum amplifying devices 44 and 45.

Anode 46 of amplifying device 44 and anode 47 of amplifying device 45 are connected by respective anode resistances 48 and 49 to a suitable source 50 of positive potential that can be a battery as illustrated schematically. Cathodes 51 and 52, of devices 44 and 45, respectively, are connected together and to a common cathode resistance 53 that is, in turn, connected to a suitable source 54 of negative potential, which can be a battery as illustrated schematically. Resistances 55 and 56 are connected in series from source 54 to ground, or the point of zero reference potential for the generator, and establish at their juncture 57 a substantially constant negative bias potential for control grid 58 of device 45. Control grid 59 of device 44 is connected to source 54 by means of a resistance 60 and is also connected to input terminal 8 through a resistance 61, which is conveniently selected to be variable.

Operation of amplifier 43 is well-known to those skilled in the art. Briefly, the voltages of anodes 46 and 47 change in opposite directions in response to a change in the voltage applied to input terminals 8 and 9. The voltage change of anode 47 is in the same direction as the change in input voltage, and the voltage change of anode 46 is opposite thereto.

A suitable circuit for multivibrator 40 comprises anode resistances 62 and 63 that connect the respective anodes 65 and 65, of devices 41 and 42, to source 50. Cathodes 66 and 67, of devices 41 and 42, are connected to ground by respective cathode load resistances 68 and 69. Control grids 70 and 71, of devices 41 ad 42, are cross-coupled to anodes 65 and 64, respectively, through capacitances 72 and 73. Grids 70 and 71 are resistively connected together by a series connection of resistances 74, 75 and 76. The intermediate resistance, resistance 75, is provided with an adjustable tap 77 that is connected to a source 78 of positive potential, that is conveniently selected to be of variable magnitude, and can comprise one or more batteries as illustrated schematically. Varying the position of tap 77 varies the duty cycle, or duration of pulse relative to the time required for a complete cycle, of multivibrator 40. A range of frequency control is effected by variable source 78.

In order to provide pulses at output terminals 4 and 5 (connected to opposite extremities respectively of cathode resistance 69) that vary in duration in response to variations in magnitude of an electric voltage applied to input terminals 8 and 9, anodes 46 and 47 are coupled to grids 70 and 71, respectively, as by electric conductors 78 and 79. In this way, a change in potential difference between terminals 8 and 9 causes multivibrator 40 to remain in one of its two bi-stable states for a longer time and to remain in the other of its two bi-stable states for a corresponding shorter time. Thus, the frequency with which a complete cycle occurs remains substantially constant, though the pulse width varies considerably. This feature permits precise synchronization of two pulse generators as well as removing an unnecessary variable parameter that would tend to confuse an operator.

When the variable pulse width generator of FIGURE 3 is used as generator 1 in FIGURE 1, a multivibrator the same as multivibrator 40 is conveniently used as generator 2. Synchronization is readily accomplished by coupling cathode 66, as by capacitance 80, to the grid of the vacuum amplifying device in generator 2 that corresponds to device 41. With such coupling, multivibrator 40 becomes the master oscillator, though the roles could be equally advantageously reversed is most cases.

It should be noted that the aforementioned synchronization means effects synchronization of the negative-going edges of the respective pulses. Thus, diodes 12 and 17 are each connected to be conductive in the reverse direction from that illustrated in FIGURE 1, when the particular generators described above are utilized. Alternatively, the positive-going edges of the respective pulses can be synchronized, as is well-known in th art. Accordingly, the leading edge of a pulse as used herein and in the appended claims refers to the synchronized edge of the pulse, whether it be positive-going or negative-going. The relative times of occurrence of the trailing, or later occurring, edges of respective pulses are detected to provide an indication of variations in magnitude of a given input voltage. When an operator uses a headset to detect variations in the time of occurrence of respective trailing edges, I have found that a multivibrator operating frequency of approximately 200 cycles per second or less, (down to about 20 cycles per second) provides comfortable listening as well as accurate detection by permitting a larger time spaced between trailing edges than is the case with higher frequencies.

While only certain preferred features of the invention have been shown by way of illustration, many modifications and changes will occur to those skilled in the art. It is, therefore, to be understood that the appended claims are intended to cover all such modifications and changes as fall within the true spirit and scope of the invention.

What I claim as new and desire to secure by Letters Patent of the United States is:

1. Apparatus for sensing variations in the magnitude of an electric voltage from a predetermined magnitude, which apparatus comprises: generating means for producing at first and second locations respectively a first and a second series of short pulses of energy having substantially equal repetition rates in the audio frequency spectrum; means coupled to said generating means for supplying said voltage to said generating means so as to vary the time spacing between generation of corresponding pulses of said first and second series, respectively, in accord with changes in the magnitude of the voltage to be sensed, said means to vary the time spacing including means for adjustably presetting a relative time relationship between said corresponding pulses; and, transducer means responsive to said generating means for producing manifestations of variations in the time of occurrence of said corresponding pulses as an indication of variations in the magnitude of said electric voltage from said predetermined magnitude.

2. Apparatus for sensing variations in the magnitude of an electric signal to be sensed from a predetermined magnitude, which comprises:
   (a) two rectangular pulse generators each having output means, said output means supplying electric pulses of substantially equal audio frequency;
   (b) means for synchronizing the leading edges of corresponding pulses from said generators;
   (c) means for coupling said electric signal to be sensed to one of said generators and varying the duration of output pulses from said one of said generators in response to changes in the magnitude of said electric signal;
   (d) means for differentiating the rectangular pulses from each of said generators to provide pairs of short pulses of alternating polarity corresponding in time spaced relationship to the occurrence of leading and trailing edges, respectively, of said rectangular pulses; and,
   (e) transducer means for audibly emitting said short pulses whereby the difference in time of occurrence between said short pulses corresponding to the trailing edges of said rectangular pulses having synchronized leading edges may be detected.

3. Apparatus for sensing variations in the magnitude of an electric signal to be sensed from a predetermined magnitude, which comprises:
   (a) two rectangular pulse generators each having input and output means, said output means each supplying electric pulses of substantially equal audio frequency and having a duration that varies in response to changes in magnitude of an electric signal applied to said input means;
   (b) means for synchronizing the leading edges of corresponding pulses from said generators;
   (c) means for coupling said electric signal to be sensed to the input of one of said generators;
   (d) means for coupling a selectively variable electric signal to the input of the other of said generators;
   (e) means for differentiating the rectangular pulses from each of said generators to provide pairs of short pulses of alternating polarity corresponding in time spaced relationship to the occurrence of leading and trailing edges, respectively, of said rectangular pulses; and,
   (f) transducer means for audibly emitting said short pulses whereby the difference in time of occurrence between said short pulses coinciding in time with the trailing edges of corresponding rectangular pulses having synchronized respective leading edges may be detected.

4. The apparatus of claim 3 including means for adjusting said selectively variable electric signal to a magnitude at which said difference in time is substantially equal to zero when the magnitude of said electric signal to be sensed is equal to said predetermined magnitude.

5. Apparatus for detecting variations in the magnitude of an electric signal to be sensed from a predetermined magnitude, which comprises:
  (a) two rectangular pulse generators each having output means, said output means supplying electric pulses of substantially equal audio frequency;
  (b) means for synchronizing the leading edges of corresponding pulses from said generators;
  (c) means for coupling said electric signal to be sensed in series with a source of selectively variable electric signal and to one of said generators;
  (d) means for varying the duration of output pulses from said one of said generators in response to changes in the combined magnitude of said signal to be sensed and said variable electric signal;
  (e) means for differentiating the rectangular pulses from each of said generators to provide pairs of short pulses of alternating polarity corresponding in time spaced relationship to the occurrence of leading and trailing edges respectively of said rectangular pulses; and,
  (f) transducer means for audibly emitting said short pulses whereby the difference in time of occurrence between said short pulses coinciding in time with the trailing edges of corresponding rectangular pulses having synchronized respective leading edges may be detected.

6. The apparatus of claim 5 including means for adjusting said source of selectively variable electric signal to a magnitude at which said difference in time is substantially equal to zero when the magnitude of said electric signal to be sensed is equal to said predetermined magnitude.

7. Apparatus for sensing variations in the magnitude of voltage from a voltage source to be sensed, said apparatus comprising:
  (a) first and second pulse generating means respectively producing first and second trains of short audio frequency electric pulses at substantially equal repetition rates, said first pulse generating means being connnected to said source and responsive to changes in the magnitude of voltage therefrom to change the relative time spacing between corresponding short audio frequency electric pulses occurring in said first and second trains, respectively; and,
  (b) transducer means coupled to said first and second pulse generating means for producing an audible manifestation of changes in said relative time spacing.

8. The apparatus of claim 7 wherein said transducer means coupled to said first and second output means including first and second spaced electro-mechanical transducers respectively coupled thereto.

References Cited
UNITED STATES PATENTS

| | | | |
|---|---|---|---|
| 3,184,606 | 5/1965 | Ovenden et al. | |
| 3,219,757 | 11/1965 | Palladino | 179—1.3 |
| 3,170,152 | 2/1965 | Long | 340—242 |

OTHER REFERENCES

IBM Technical Disclosure Bul.: "Voltage Pulse Width Select Circuit," by A. W. Smith; vol. 7, No. 1; June 1964, p. 27.

JOHN W. CALDWELL, *Primary Examiner.*

THOMAS B. HABECKER, NEIL C. READ, *Examiners.*

D. M. MYER, *Assistant Examiner.*